United States Patent
Kang

(10) Patent No.: US 11,543,701 B2
(45) Date of Patent: Jan. 3, 2023

(54) LIGHTNESS ADJUSTING METHOD FOR DISPLAY SYSTEM, LIGHTNESS ADJUSTING SYSTEM AND DISPLAY SYSTEM

(71) Applicant: HKC CORPORATION LIMITED, Shenzhen (CN)

(72) Inventor: Chih Tsung Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/272,933

(22) PCT Filed: Dec. 20, 2018

(86) PCT No.: PCT/CN2018/122281
§ 371 (c)(1),
(2) Date: Mar. 3, 2021

(87) PCT Pub. No.: WO2020/093544
PCT Pub. Date: May 14, 2020

(65) Prior Publication Data
US 2021/0318578 A1    Oct. 14, 2021

(30) Foreign Application Priority Data
Nov. 7, 2018    (CN) .......................... 201811319854.0

(51) Int. Cl.
G02F 1/13357    (2006.01)
G02F 1/1335    (2006.01)
(Continued)

(52) U.S. Cl.
CPC .. G02F 1/133615 (2013.01); G02F 1/133603 (2013.01); G02F 1/133604 (2013.01);
(Continued)

(58) Field of Classification Search
None
See application file for complete search history.

(56) References Cited

U.S. PATENT DOCUMENTS

2006/0061705 A1*  3/2006  Onishi ................. G02B 6/0068
                                            349/62
2007/0247560 A1* 10/2007  Shin ..................... G09G 3/3413
                                            349/46
(Continued)

FOREIGN PATENT DOCUMENTS

CN    101295466 A    10/2008
CN    102547361 A     7/2012
(Continued)

OTHER PUBLICATIONS

Wenjie Yao, the International Searching Authority written comments, dated Jul. 2019, CN.
(Continued)

*Primary Examiner* — Phu Vu

(57) ABSTRACT

The present application relates to a lightness adjusting method for a display system. The method includes the steps of: writing a first driving signal into a display panel; controlling a first lens and a backlight module to be turned on simultaneously, where a plurality of light-emitting elements of the backlight module are turned on simultaneously, and the first lens and the plurality of light-emitting elements of the backlight module are turned on simultaneously; adjusting a first turn-on time of each light-emitting element; controlling a second lens and the backlight module to be turned on simultaneously, where the plurality of light-emitting elements of the backlight module are turned on simultaneously, and the second lens and the plurality of light-emitting elements of the backlight module are turned on simultaneously; and adjusting a second turn-on time of each light-emitting element.

20 Claims, 4 Drawing Sheets

(51) Int. Cl.
*G09G 3/34* (2006.01)
*G09G 3/36* (2006.01)

(52) U.S. Cl.
CPC ....... *G02F 1/133607* (2021.01); *G09G 3/342* (2013.01); *G09G 3/3426* (2013.01); *G09G 3/3611* (2013.01); *G09G 2320/0233* (2013.01); *G09G 2320/064* (2013.01)

(56) References Cited

U.S. PATENT DOCUMENTS

2012/0154555 A1 6/2012 Baba et al.
2014/0028736 A1* 1/2014 Chen ................... G09G 3/3611
345/102

FOREIGN PATENT DOCUMENTS

| CN | 102707469 A | 10/2012 |
| CN | 102881261 A | 1/2013 |
| CN | 102968964 A | 3/2013 |
| CN | 103731650 A | 4/2014 |
| CN | 107564470 A | 1/2018 |

OTHER PUBLICATIONS

Wenjie Yao, the International Searching Report, dated Jul. 2019, CN.

* cited by examiner

LIGHTNESS ADJUSTING METHOD FOR DISPLAY SYSTEM, LIGHTNESS ADJUSTING SYSTEM AND DISPLAY SYSTEM

CROSS REFERENCE OF RELATED APPLICATIONS

The present application claims the priority to the Chinese Patent Application No. CN201811319854.0, filed with National Intellectual Property Administration, PRC on Nov. 7, 2018 and entitled "LIGHTNESS ADJUSTING METHOD FOR DISPLAY SYSTEM, LIGHTNESS ADJUSTING SYSTEM AND DISPLAY SYSTEM", which is incorporated herein by reference in its entirety.

TECHNICAL FIELD

The present application relates to the technical field of liquid crystal display, and in particular, to a lightness adjusting method for a display system, a lightness adjusting system, and a display system.

BACKGROUND

The statements herein merely provide background information related to the present application and do not necessarily constitute the conventional art.

The lightness displayed by a liquid crystal panel is controlled by the cooperation of a backlight module, a signal driving circuit and a glasses driving circuit. The backlight module is composed of a plurality of light-emitting elements arranged in a certain way, the light-emitting elements are used to lighten the blocks of the liquid crystal panel, and average lightness of backlight of each block of the liquid crystal panel is different due to the differences in manufacturing processes of the light-emitting elements; the liquid crystal panel and liquid crystal glasses need to be driven for a certain time to output stable transmittance due to physical properties of liquid crystal. If the liquid crystal glasses are turned on synchronously with the writing of the liquid crystal panel driving signal and the turn-on of the backlight module, the interaction of the transmittance response of the liquid crystal glasses, the transmittance response of the liquid crystal panel and the average lightness of backlight of each block of the liquid crystal panel causes that the product of the transmittance response of the liquid crystal glasses corresponding to each block of the liquid crystal panel, the transmittance response of the liquid crystal panel and the average lightness of the backlight of each block of the liquid crystal panel is not equal, thus lightness of each block of the liquid crystal panel transmitting through the liquid crystal glasses is not uniform.

SUMMARY

According to various embodiments of the present application, a lightness adjusting method for a display system, a lightness adjusting system and a display system are provided.

A lightness adjusting method for a display system includes adjusting the lightness of a display panel transmitting through a pair of glasses, the display panel is lightened by a backlight module, the pair of glasses includes a first lens and a second lens, the display panel includes a plurality of blocks, and the backlight module includes a plurality of light-emitting elements; and the lightness adjusting method for the display system includes steps of:

writing a first driving signal into the display panel;
controlling the first lens and the backlight module to be turned on simultaneously, where a plurality of light-emitting elements of the backlight module are turned on simultaneously, and the first lens and the plurality of light-emitting elements of the backlight module are turned on simultaneously;
adjusting a first turn-on time of each light-emitting element;
writing a second driving signal into the display panel;
controlling the second lens and the backlight module to be turned on simultaneously, where a plurality of light-emitting elements of the backlight module are turned on simultaneously, and the second lens and the plurality of light-emitting elements of the backlight module are turned on simultaneously; and
adjusting a second turn-on time of each light-emitting element.

In one or more embodiments, the driving current for each light-emitting element is equal.

In one or more embodiments, the plurality of light-emitting elements compose a backlight source, the backlight source is a single-side edge-type light source, a number of the light-emitting elements is N, the blocks correspond to the light-emitting elements one to one, and each light-emitting element is configured to lighten one corresponding block.

In one or more embodiments, the plurality of light-emitting elements compose a backlight source, the backlight source is a bilateral-side edge-type light source, a number of the light-emitting elements is 2N, every two light-emitting elements correspond to one block, and every two light-emitting elements lighten one corresponding block.

In one or more embodiments, the plurality of light-emitting elements compose a backlight source, the backlight source is a direct-type light source, a number of the light-emitting elements is N*M, the light-emitting elements are arranged in a matrix of N rows and M columns, M light-emitting elements in each row correspond to one block, and the M light-emitting elements in each row lighten one corresponding block.

In one or more embodiments, the light-emitting element is a light-emitting diode.

In one or more embodiments, the light-emitting element is a cold cathode fluorescent lamp.

In one or more embodiments, the glasses are 3D glasses.

In one or more embodiments, the display panel is a 3D display panel.

A lightness adjusting system is configured to adjust the lightness of a display panel transmitting through a pair of glasses, the display panel is lightened by a backlight module, the pair of glasses includes a first lens and a second lens, the display panel includes a plurality of blocks, and the backlight module includes a plurality of light-emitting elements;

the lightness adjusting system includes a signal driving circuit, a glasses driving circuit and a control circuit;

the signal driving circuit is configured to write a first driving signal into the display panel; the glasses driving circuit is configured to control the first lens to be turned on; the control circuit is configured to control the backlight module to be turned on; the control circuit is further configured to control the first lens and the backlight module to be turned on simultaneously through the glasses driving circuit;

where a plurality of light-emitting elements of the backlight module are turned on simultaneously, and the first lens and the plurality of light-emitting elements of the backlight module are turned on simultaneously;

the control circuit is further configured to adjust a first turn-on time of each light-emitting element:

the signal driving circuit is further configured to write a second driving signal into the display panel; the glasses driving circuit is configured to control the second lens to be turned on; the control circuit is further configured to control the second lens and the backlight module to be turned on simultaneously through the glasses driving circuit;

where a plurality of light-emitting elements of the backlight module are turned on simultaneously, and the second lens and the plurality of light-emitting elements of the backlight module are turned on simultaneously; and the control circuit is further configured to adjust a second turn-on time of each light-emitting element.

A display system includes a display panel and the lightness adjusting system described above.

The details of one or more embodiments of the present application are set forth in the accompanying drawings and the description below. Other features, objects and advantages of the present application will be apparent from the specification, drawings and claims.

BRIEF DESCRIPTION OF DRAWINGS

In order to more clearly illustrate the technical solutions in the embodiments of the present application or in the conventional art, the drawings required in the description of the embodiments or the conventional art will be briefly described below. Obviously, the drawings in the following description are merely some embodiments of the present application, and those of ordinary skill in the art can obtain other drawings according to the drawings without any inventive labor.

DETAILED DESCRIPTION OF EMBODIMENTS

Figure 1:
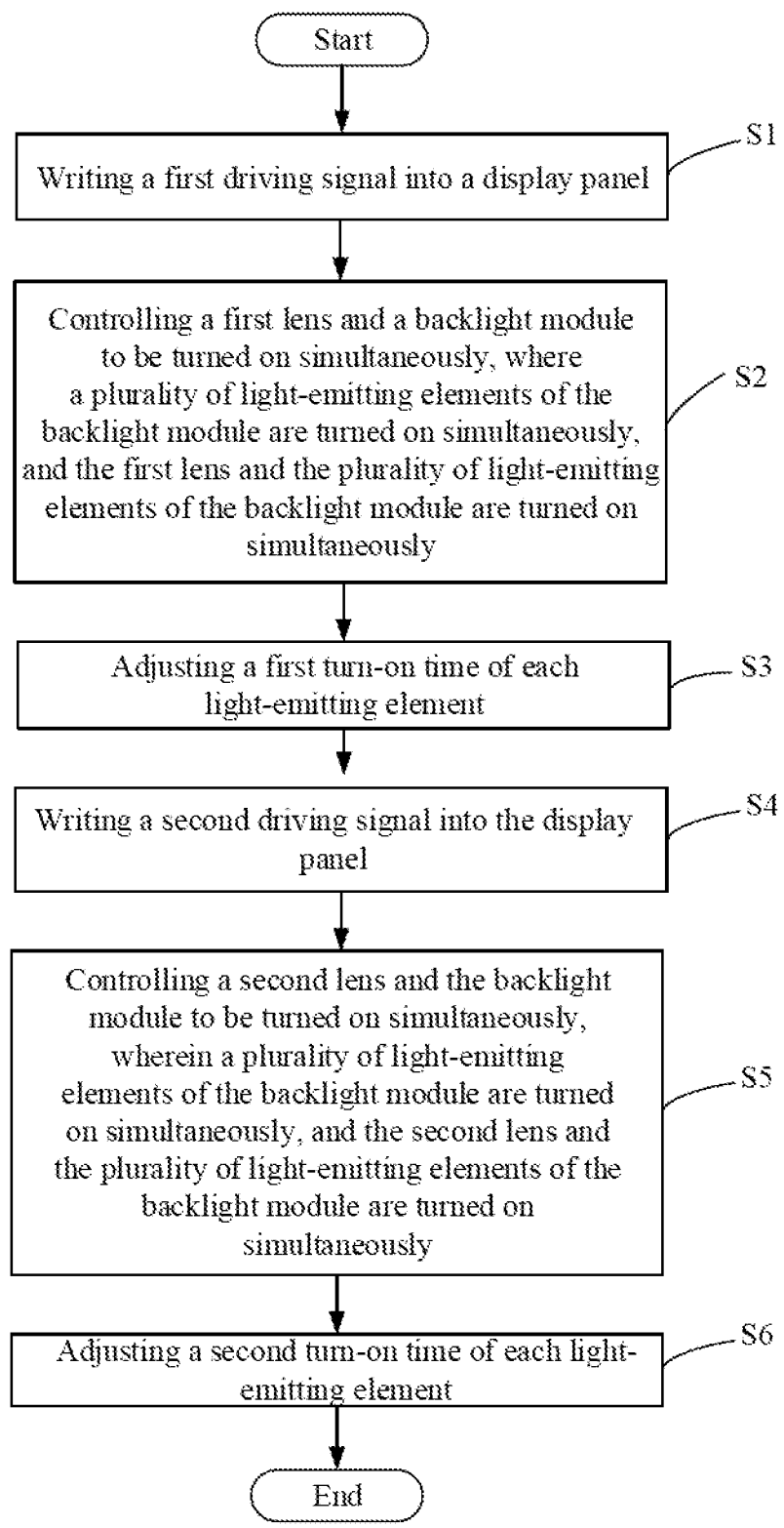
FIG. 1 is a flow chart of a lightness adjusting method for a display system according to an embodiment.

Referring to FIG. 1, which is a flow chart of a lightness adjusting method for a display system according to an optional embodiment of the present application. It should be noted that the method of the present application is not limited to the order of the following steps, and in other embodiments, the method of the present application may include only a part of the following steps, or a part of the steps may be deleted. In addition, in other embodiments, one step may be divided into multiple steps, or multiple steps may be combined into one step.

The lightness adjusting method for the display system is used to adjust the lightness of a display panel transmitting through a pair of glasses, the display panel is lightened by a backlight module, the pair of glasses includes a first lens and a second lens, the display panel includes a plurality of blocks, the backlight module includes a plurality of light-emitting elements, and the plurality of light-emitting elements compose a backlight source. The lightness adjusting method for the display system includes:

at step S1, a first driving signal is written into the display panel.

In one or more embodiments, the glasses are 3D glasses, and the display panel is a 3D display panel.

The backlight may be an edge-type light source or a direct-type light source. The edge-type light source includes a single-side edge-type light source and a bilateral-side edge-type light source. Each light-emitting element of the backlight module is turned on simultaneously. In one display period, the driving signals include a first driving signal and a second driving signal.

Figure 2:
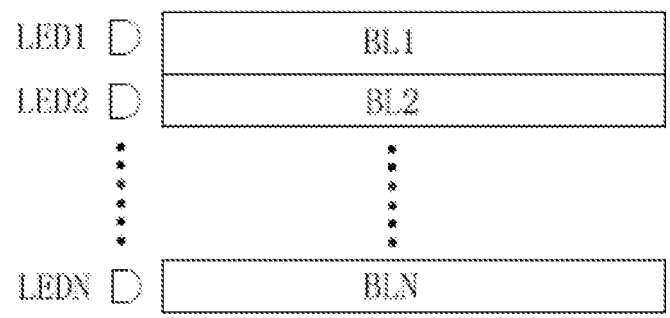
FIG. 2 is a corresponding diagram of a single-side edge-type light source and a block according to an embodiment.

As shown in FIG. 2, in one or more embodiments, the edge-type light source is a single-side edge-type light source, the light-emitting elements are Light-Emitting Diodes (LEDs) and a number of the light-emitting elements is N, the blocks correspond to the LEDs one to one, and each LED is used to lighten one corresponding block, for example, the LED1 lightens block BL1, the LED2 lightens block BL2, . . . , and the LEDN lightens block BLN.

Figure 3:
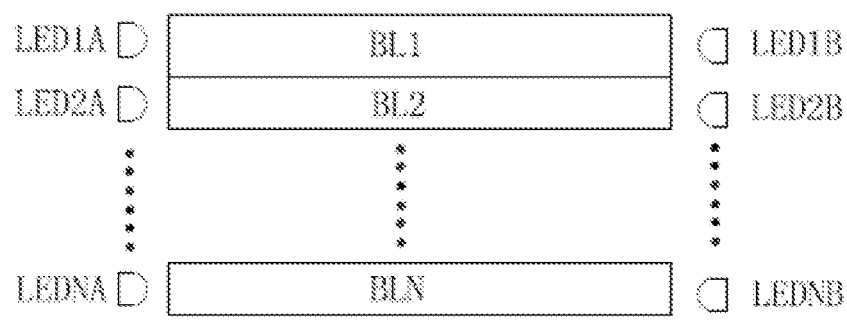
FIG. 3 is a corresponding diagram of a bilateral-side edge-type light source and a block according to an embodiment.

As shown in FIG. 3, in one or more embodiments, the edge-type light source is a bilateral-side edge-type light source, the light-emitting elements are LEDs and a number of the light-emitting elements is 2N, every two LEDs correspond to one block, and every two LEDs lighten one block, for example, the LED1A and LED1B lighten block BL1, the LED2A and LED2B lighten block BL2, . . . , and the LEDNA and LEDNB lighten block BLN.

The edge-type light source with a small number of light-emitting elements is beneficial to reducing product weight.

Figure 4:
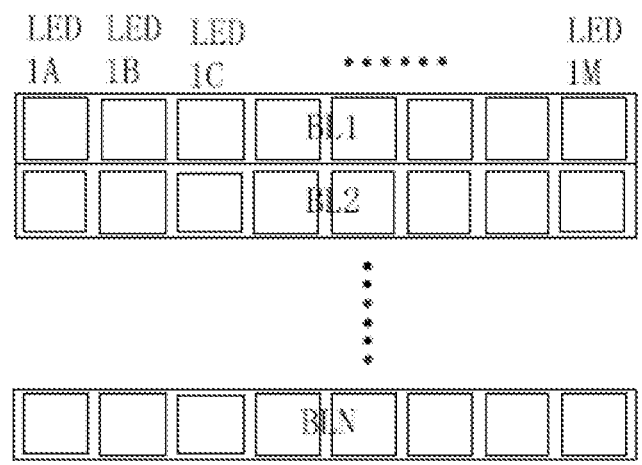
FIG. 4 is a corresponding diagram of a direct-type light source and a block according to an embodiment.

As shown in FIG. 4, in one or more embodiments, the backlight is a direct-type light source. A number of the light-emitting elements is N*M, the light-emitting elements are arranged in a matrix of N rows and M columns, M LEDs in each row correspond to one block, the M LEDs in each row lighten one corresponding block, and the light-emitting elements are LEDs. The LED1A, LED1B, . . . , and LED1M compose a first row of LED backlight unit LED1; the LED2A, LED2B, . . . , LED2M compose a second row of LED backlight unit LED2; . . . , and the LEDNA, LEDNB, . . . and LEDNM compose an N-th row of LED backlight unit LEDN. Each row of LED backlight units is used to lighten one corresponding block, for example, the LED1 lightens block BL1, the LED2 lightens block BL2, . . . , and the LEDN lightens block BLN.

The direct-type light source can make the lightness of each block of the display panel more uniform.

The light-emitting element may also be a Cold Cathode Fluorescent Lamp (CCFL).

At step S2, the first lens and the backlight module are controlled to be turned on simultaneously, where a plurality of light-emitting elements of the backlight module are turned on simultaneously, and the first lens and the plurality of light-emitting elements of the backlight module are turned on simultaneously.

The lightness of each block of the display panel transmitting through the liquid crystal glasses is the product of the display panel transmittance, glasses transmittance and average lightness of backlight of the display panel. The average lightness of backlight of the display panel is the average lightness of the lightened backlight source of the display panel, and the lightness of the display panel is the lightness displayed by the display panel. The liquid crystal panel and liquid crystal glasses need to be driven for a certain time to output stable transmittance due to physical properties of liquid crystal, and the output time for the display panel to achieve the stable transmittance is inconsistent with the output time for the glasses to achieve the stable transmittance. If the driving signal is written into the display panel and the glasses are turned on synchronously with the turn-on of backlight module, the product of the transmittance of each block of the display panel, the transmittance of each block corresponding to the glasses and the average lightness of backlight of each block of the display panel is different. Therefore, adjusting the sequence of writing the driving signal into the display panel, turning on the glasses and turning on the backlight module causes the transmittance of the block of the display panel to be approximately equal, and causes the product of the transmittance of each block of the display panel, the transmittance of the glasses corresponding to each block and average lightness of backlight of each block of the display panel to be approximately equal, thus causing lightness of each block of the display panel transmitting through the liquid crystal glasses to be approximately uniform. The average lightness of backlight of each block corresponds to the average lightness of the light-emitting elements of each block. The transmittance of the glasses corresponding to each block is the transmittance of the glasses corresponding to the light-emitting elements corresponding to each block.

According to the present application, on the premise that the plurality of light-emitting elements of the backlight module are simultaneously turned on, by writing the driving signal into the display panel and controlling the first lens and the backlight module to be simultaneously turned on, the display panel has enough time response to reach a stable and approximately equal transmittance, and at the moment, the product of the transmittance of each block of the display panel, the transmittance of the glasses corresponding to each block and average lightness of backlight of each block of the display panel is approximately equal.

At step S3, a first turn-on time of each light-emitting element is adjusted.

The first turn-on time is the turn-on time of each light-emitting element in one display period of the display panel, corresponding to the writing of the first driving signal and the turn-on of the first lens.

According to the present application, the average lightness of backlight of each block of the display panel is further adjusted by adjusting the turn-on time of each light-emitting element, so that the product of the transmittance of each block of the display panel, the transmittance of the glasses corresponding to each block and the average lightness of backlight of each block of the display panel is equal, and the lightness of each block of the display panel transmitting through the liquid crystal glasses is approximately uniform.

It should be noted that, in one display period of the display panel, the first driving signal is written into the display panel, and each light-emitting element is turned off after the turn-on time thereof reaches the corresponding first turn-on time.

At step S4, a second driving signal is written into the display panel.

At step S5, the second lens and the backlight module are controlled to be turned on simultaneously, where a plurality of light-emitting elements of the backlight module are turned on simultaneously, and the second lens and the plurality of light-emitting elements of the backlight module are turned on simultaneously.

At step S6, a second turn-on time of each light-emitting element is adjusted.

The second turn-on time is the turn-on time of each light-emitting element in one display period of the display panel, corresponding to the writing of the second driving signal and the turn-on of the second lens.

It should be noted that, in one display period of the display panel, the second driving signal is written into the display panel, and each light-emitting element is turned off after the turn-on time thereof reaches the corresponding second turn-on time.

The driving current for each light-emitting element is equal. The driving current is used to drive the light-emitting element to emit light.

Figure 5:
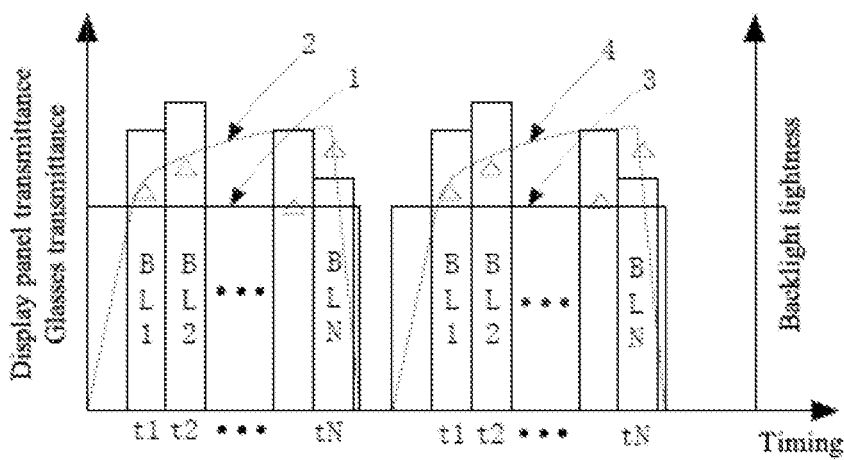
FIG. 5 is a timing diagram illustrating display panel transmittance, glasses transmittance and backlight lightness in one display period according to an embodiment.

To better illustrate the method of the present application, a detailed description is given below with reference to FIGS. 5 to 8. Referring to FIG. 5, the turn-on time of each light-emitting element is $t1, t2, \ldots, tN$, i.e. the lightening time of each corresponding block is $t1, t2, \ldots, tN$, $t1=t2 \ldots =tN=t$, where t is a preset time. Curve 1 is the first driving signal written into the display panel. Curve 2 is the first glasses transmittance of the first lens corresponding to each light-emitting element, and the first glasses transmittance of the first lens corresponding to each light-emitting element is $L\_T\_1, L\_T\_2, \ldots,$ and $L\_T\_N$, respectively. "Δ" in the first half of the display period of FIG. 5 is a first panel transmittance of each block corresponding to the turn-on time of each light-emitting element, and first panel transmittance of each block corresponding to the turn-on time of each light-emitting element is $OC\_TL\_1, OC\_TL\_2, \ldots, OC\_TL\_N$, respectively.

The rectangle in the first half of the display period of FIG. 5 represents the average lightness of backlight of each block, the average lightness of the block BL1 is $BL\_ave\_1$, the average lightness of the block BL2 is $BL\_ave\_2, \ldots,$ and the average lightness of block BLN is $BL\_ave\_N$. Due to the difference in the manufacturing process of the backlight module, $BL\_ave\_1 \neq BL\_ave\_2 \neq \ldots \neq BL\_ave\_N$. At this time, the lightness of each block of the display panel viewed by the user through the first lens, $BL\_ave\_1*OC\_TL1*L\_T\_1 \neq BL\_ave\_2*OC\_TL\_2*L\_T\_2 \neq \ldots \neq BL\_ave\_N*OC\_TL\_N*L\_T\_N$, i.e., the lightness of each block of the display panel transmitting through the first lens is not uniform.

Curve 3 is the second driving signal written into the display panel. Curve 4 is the second glasses transmittance of the second lens corresponding to each light-emitting element, and the second glasses transmittance of the second lens corresponding to each light-emitting element is $R\_T\_1, R\_T\_2, \ldots,$ and $R\_T\_N$, respectively. "Δ" in the second half of the display period of FIG. 5 is a second panel transmittance of each block corresponding to the turn-on time of each light-emitting element, and second panel transmittance of each block corresponding to the turn-on time of each light-emitting element is $OC\_TR\_1, OC\_TR\_2, \ldots, OC\_TR\_N$, respectively. The rectangle in the second half of the display period of FIG. 5 represents the average lightness of backlight of each block, the average lightness of the block BL1 is $BL\_ave\_1$, the average lightness of the block BL2 is BL_ave_2, . . . , and the average lightness of block BLN is BL_ave_N. Due to the difference in the manufacturing process of the backlight module, BL_ave_1≠ BL_ave_2≠ . . . ≠ BL_ave_N. At this time, the lightness of each block of the display panel viewed by the user through the second lens, BL_ave_1*OC_TR_1*R_T_1≠BL_ave_2*OC_TR_2*R_T_2≠ . . . ≠ BL_ave_N*OC_TR_N*R_T_N. i.e., the lightness of each block of the display panel transmitting through the first lens is not uniform.

Figure 6:
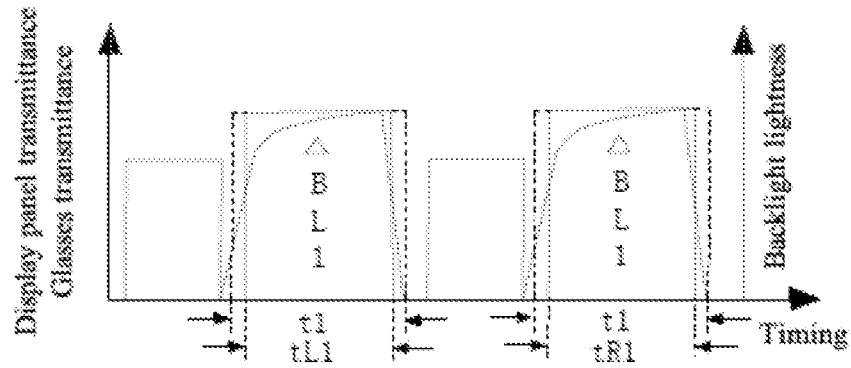
FIG. 6 is a timing diagram illustrating display panel transmittance, glasses transmittance and backlight lightness in one display period according to another embodiment.
Figure 7:
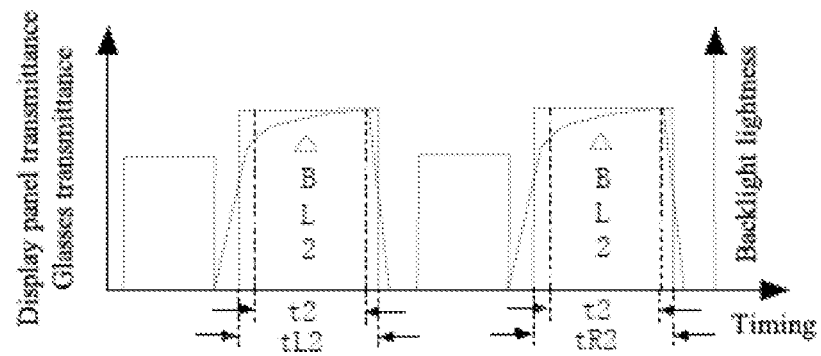
FIG. 7 is a timing diagram illustrating display panel transmittance, glasses transmittance and backlight lightness in one display period according to another embodiment.
Figure 8:
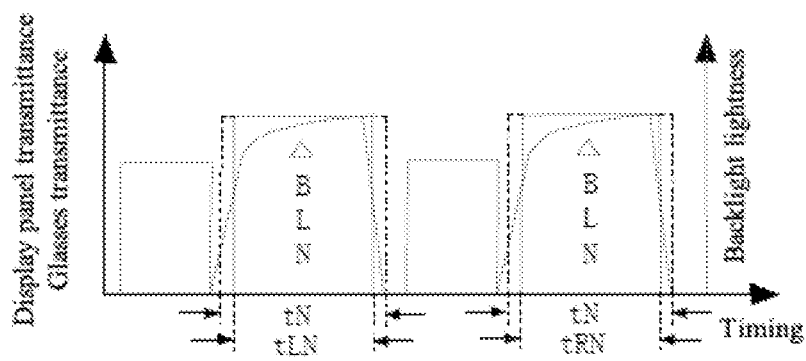
FIG. 8 is a timing diagram illustrating display panel transmittance, glasses transmittance and backlight lightness in one display period according to another embodiment.

Referring to FIGS. 6 to 8, by writing the driving signal into the display panel and then controlling the first mirror and the backlight module to be turned on simultaneously, the display panel has enough time response to reach a stable and approximately equal transmittance, and the average lightness of each block of the display panel is further adjusted by adjusting the turn-on time of each light-emitting element. The turn-on time of each light-emitting element is adjusted from t1, t2, . . . , tN to the first turn-on time tL1, tL2, . . . , tLN and the second turn-on time tR1, tR2, . . . , tRN. Corresponding to the first turn-on time of each light-emitting element, the average lightness of the block BL1 is adjusted from BL_ave_1 to BL_ave_L1', the average lightness of the block BL2 is adjusted from BL_ave_2 to BL_ave_L2', . . . , and the average lightness of the block BLN is adjusted from BL_ave_N to BL_ave_LN'. The first panel transmittance of each block corresponding to the turn-on time of each light-emitting element is adjusted from OC_TL_1, OC_TL_2, . . . , OC_TL_N to OC_TL_1', OC_TL_2', . . . , OC_TL_N', and OC_TL_1' ≈ OC_TL_2' . . . ≈ OC_TL_N', respectively. The first glasses transmittance of the first lens corresponding to each light-emitting element is L_T. At this time, the lightness of each block of the display panel viewed by the user through the first lens, BL_ave_L1'*OC_TL_1'*L_T=BL_ave_L2'*OC_TL_2'*L_T= . . . =BL_ave_LN'*OC_TL_N'*L_T, i.e., the lightness of each block of the display panel transmitting through the first lens is uniform.

Corresponding to the second turn-on time of each light-emitting element, the average lightness of the block BL1 is adjusted from BL_ave_1 to BL_ave_R1', the average lightness of the block BL2 is adjusted from BL_ave_2 to BL_ave_R2', . . . , and the average lightness of the block BLN is adjusted from BL_ave_N to BL_ave_RN'. The second glasses transmittance of the second lens corresponding to each light-emitting element is R_T. The second panel transmittance of each block corresponding to the turn-on time of each light-emitting element is adjusted from OC_TR_1, OC_TR_2, . . . , OC_TR_N to OC_TR_1', OC_TR_2', . . . , OC_TR_N', and OC_TR_1'≈OC_TR_2' . . . ≈OC_TR_N', respectively. At this time, the lightness of each block of the display panel viewed by the user through the second lens, BL_ave_R1'*OC_TR_1'*R_T=BL_ave_R2'*OC_TR_2'*R_T= . . . =BL_ave_RN'*OC_TR_N'*R_T, i.e., the lightness of each block of the display panel transmitting through the first lens is uniform.

To summary, according to the lightness adjusting method for display system of the present application, on the premise that the plurality of light-emitting elements of the backlight module are simultaneously turned on, by writing the driving signal into the display panel and then controlling the first lens and the backlight module to be simultaneously turned on, the display panel has enough time response to reach a stable and approximately equal transmittance, and the product of the transmittance of each block of the display panel, the transmittance of the glasses corresponding to each block and average lightness of backlight of each block of the display panel is approximately equal; and the average lightness of each block of the display panel is further adjusted by adjusting the turn-on time of each light-emitting element, so that the product of the transmittance of each block of the display panel, the transmittance of the glasses corresponding to each block and the average lightness of backlight of each block of the display panel is equal, and the lightness of each block of the display panel transmitting through the liquid crystal glasses is uniform.

The lightness adjusting method of the display system provided in the embodiments of the present application will be described below in detail with reference to FIG. 9. It should be noted that, the lightness adjusting system shown in FIG. 9 is used to execute the method of the embodiment shown in FIG. 1 of the present application, and for convenience of description, only the portions related to the embodiments of the present application are shown, and specific technical details are not disclosed with reference to the embodiment shown in FIG. 1 of the present application.

Figure 9:
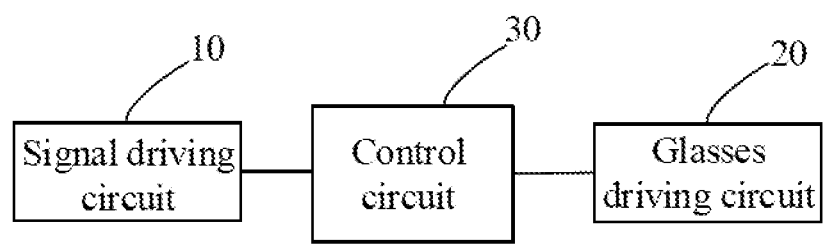
FIG. 9 is a function block diagram of a lightness adjusting system according to an embodiment.

Referring to FIG. 9, the lightness adjusting system is used to adjust the lightness of a display panel transmitting through a pair of glasses, the display panel is lightened by a backlight module, the pair of glasses includes a first lens and a second lens, the display panel includes a plurality of blocks, the backlight module includes a plurality of light-emitting elements, and the plurality of light-emitting elements compose a backlight source. The lightness adjusting system includes a signal driving circuit 10, a glasses driving circuit 20 and a control circuit 30.

The signal driving circuit 10 is used to write a first driving signal into the display panel. The glasses driving circuit 20 is used to control the first lens to be turned on; the control circuit 30 is used to control the backlight module to be turned on. The control circuit 30 is also used to control the first lens and the backlight module to be turned on simultaneously through the glasses driving circuit 20. Where a plurality of light-emitting elements of the backlight module are turned on simultaneously, and the first lens and the plurality of light-emitting elements of the backlight module are turned on simultaneously. The control circuit 30 is used to adjust a first turn-on time of each light-emitting element.

The signal driving circuit 10 is also used to write a second driving signal into the display panel. The glasses driving circuit 20 is used to control the second lens to be turned on. The control circuit 30 is used to control the second lens and the backlight module to be turned on simultaneously through the glasses driving circuit 20. Where a plurality of light-emitting elements of the backlight module are turned on simultaneously, and the second lens and the plurality of light-emitting elements of the backlight module are turned on simultaneously. The control circuit 30 is also used to adjust the second turn-on time of each light-emitting element.

According to the lightness adjusting system, on the premise that the plurality of light-emitting elements of the backlight module are simultaneously turned on, by writing the driving signal into the display panel and then controlling the first lens and the backlight module to be simultaneously turned on, the display panel has enough time response to reach a stable and approximately equal transmittance, and the product of the transmittance of each block of the display panel, the transmittance of the glasses corresponding to each block and average lightness of backlight of each block of the display panel is approximately equal; and the average lightness of each block of the display panel is further adjusted by adjusting the turn-on time of each light-emitting element, so that the product of the transmittance of each block of the display panel, the transmittance of the glasses corresponding to each block and the average lightness of backlight of each block of the display panel is equal, and the lightness of each block of the display panel transmitting through the liquid crystal glasses is uniform.

The present application also provides a display system, the display system includes a display panel and the lightness adjusting system described above.

The display panel of the embodiments of the present application may be any one of the following: liquid crystal display panels, OLED display panels, QLED display panels, Twisted Nematic (TN) or Super Twisted Nematic (STN) display panels, In-Plane Switching (IPS) display panels, Vertical Alignment (VA) display panels, curved panel, or other display panels.

The technical features of the embodiments described above can be combined arbitrarily. For the sake of brevity, all possible combinations of the technical features of the above embodiments are not described, and such combinations of the technical features shall be deemed to fall within the scope of the present disclosure as long as there is no contradiction.

The embodiments described above only describe several implementations of the present disclosure, and the description thereof is specific and detailed. However, those cannot be therefore construed as limiting the scope of the disclosure. It should be noted that, for those of ordinary skill in the art, several variations and modifications can be made without departing from the concept of the present disclosure, which also fall within the scope of the present disclosure. Therefore, the protection scope of the present application shall be defined by the appended claims.

What is claimed is:

1. A lightness adjusting method for a display system, comprising adjusting the lightness of a display panel transmitting through a pair of glasses, the display panel is lightened by a backlight module, the pair of glasses comprises a first lens and a second lens, the display panel comprises a plurality of blocks, and the backlight module comprises a plurality of light-emitting elements; and the lightness adjusting method for the display system comprises:
   feeding a first driving signal into the display panel;
   controlling the first lens and the backlight module to be turned on simultaneously, wherein a plurality of light-emitting elements of the backlight module are turned on simultaneously, and the first lens and the plurality of light-emitting elements of the backlight module are turned on simultaneously;
   adjusting a first turn-on duration of each light-emitting element;
   feeding a second driving signal into the display panel;
   controlling the second lens and the backlight module to be turned on simultaneously, wherein a plurality of light-emitting elements of the backlight module are turned on simultaneously, and the second lens and the plurality of light-emitting elements of the backlight module are turned on simultaneously; and
   adjusting a second turn-on duration of each light-emitting element.

2. The lightness adjusting method of the display system according to claim 1, wherein a driving current for each light-emitting element is equal.

3. The lightness adjusting method of the display system according to claim 1, wherein the plurality of light-emitting elements compose a backlight source, the backlight source is a single-side edge-type light source, a number of the light-emitting elements is N, the blocks correspond to the light-emitting elements one to one, and each light-emitting element is configured to lighten one corresponding block.

4. The lightness adjusting method of the display system according to claim 1, wherein the plurality of light-emitting elements compose a backlight source, the backlight source is a bilateral-side edge-type light source, a number of the light-emitting elements is 2N, every two light-emitting elements correspond to one block, and every two light-emitting elements lighten one corresponding block.

5. The lightness adjusting method of the display system according to claim 1, wherein the plurality of light-emitting elements compose a backlight source, the backlight source is a direct-type light source, a number of the light-emitting elements is N*M, the light-emitting elements are arranged in a matrix of N rows and M columns, M light-emitting elements in each row correspond to one block, and the M light-emitting elements in each row lighten one corresponding block.

6. The lightness adjusting method of the display system according to claim 1, wherein the light-emitting element is a light-emitting diode.

7. The lightness adjusting method of the display system according to claim 1, wherein the light-emitting element is a cold cathode fluorescent lamp.

8. The lightness adjusting method of the display system according to claim 1, wherein the glasses are 3D glasses.

9. The lightness adjusting method of the display system according to claim 1, wherein the display panel is a 3D display panel.

10. A lightness adjusting system, configured to adjust the lightness of a display panel transmitting through a pair of glasses, the display panel is operative to be lightened by a backlight module, the pair of glasses comprises a first lens and a second lens, the display panel comprises a plurality of blocks, the backlight module comprises a plurality of light-emitting elements;
   the lightness adjusting system comprises a signal driving circuit, a glasses driving circuit and a control circuit;
   the signal driving circuit is configured to feed first driving signal into the display panel; the glasses driving circuit is configured to control the first lens to be turned on; the control circuit is configured to control the backlight module to be turned on; the control circuit is further configured to control the first lens and the backlight module to be turned on simultaneously through the glasses driving circuit after the first driving signal has been fed into the display panel;
   wherein a plurality of light-emitting elements of the backlight module are turned on simultaneously, and the first lens and the plurality of light-emitting elements of the backlight module are turned on simultaneously;
   the control circuit is further configured to adjust a first turn-on duration of each light-emitting element;
   the signal driving circuit is further configured to feed a second driving signal into the display panel; the glasses driving circuit is configured to control the second lens to be turned on; the control circuit is further configured to control the second lens and the backlight module to be turned on simultaneously through the glasses driving circuit after the second driving signal has been fed into the display panel;
   wherein a plurality of light-emitting elements of the backlight module are turned on simultaneously, and the second lens and the plurality of light-emitting elements of the backlight module are turned on simultaneously; and the control circuit is further configured to adjust a second turn-on duration of each light-emitting element.

11. The lightness adjusting system of claim 10, wherein a driving current for each light-emitting element is equal.

12. The lightness adjusting system of claim 10, wherein the plurality of light-emitting elements compose a backlight source, the backlight source is a single-side edge-type light source, a number of the light-emitting elements is N, the blocks correspond to the light-emitting elements one to one, and each light-emitting element is configured to lighten one corresponding block.

13. The lightness adjusting system of claim 10, wherein the plurality of light-emitting elements compose a backlight source, the backlight source is a bilateral-side edge-type light source, a number of the light-emitting elements is 2N, every two light-emitting elements correspond to one block, and every two light-emitting elements lighten one corresponding block.

14. The lightness adjusting system of claim 10, wherein the plurality of light-emitting elements compose a backlight source, the backlight source is a direct-type light source, a number of the light-emitting elements is N*M, the light-emitting elements are arranged in a matrix of N rows and M columns, M light-emitting elements in each row correspond to one block, and the M light-emitting elements in each row lighten one corresponding block.

15. The lightness adjusting system of claim 10, wherein the light-emitting element is a light-emitting diode.

16. The lightness adjusting system of claim 10, wherein the light-emitting element is a cold cathode fluorescent lamp.

17. The lightness adjusting system of claim 10, wherein the glasses are 3D glasses.

18. The lightness adjusting system of claim 10, wherein the display panel is a 3D display panel.

19. A display system, comprising a display panel and the lightness adjusting system of claim 10.

20. The lightness adjusting method of the display system according to claim 1, wherein in the operations of feeding the first driving signal into the display panel, and controlling the first lens and the backlight module to be turned on simultaneously after first driving signal has been fed into the display panel, a transmittance of each block of the display panel is caused to be approximately equal, and wherein a product of the transmittance of each block of the display panel, a transmittance of the first lens of the glasses corresponding to each block, and an average lightness of backlight of each block of the display panel is caused to be approximately equal; wherein in the operation of adjusting the first turn-on duration of each light-emitting element, an average lightness of backlight of each block of the display panel is further adjusted, so that the product of the transmittance of each block of the display panel, the the transmittance of the first lens of the glasses corresponding to each block, and the average lightness of backlight of each block of the display panel is equal, and the lightness of each block of the display panel transmitting through the first lens of the glasses is approximately uniform;

wherein in the operations of feeding the second driving signal into the display panel, and controlling the second lens and the backlight module to be turned on simultaneously after second driving signal has been fed into the display panel, a transmittance of each block of the display panel is caused to be approximately equal, and wherein a product of the transmittance of each block of the display panel, a transmittance of the second lens of the glasses corresponding to each block, and an average lightness of backlight of each block of the display panel is caused to be approximately equal; wherein in the operation of adjusting the second turn-on duration of each light-emitting element, an average lightness of backlight of each block of the display panel is further adjusted, so that the product of the transmittance of each block of the display panel, the the transmittance of the second lens of the glasses corresponding to each block, and the average lightness of backlight of each block of the display panel is equal, and the lightness of each block of the display panel transmitting through the second lens of the glasses is approximately uniform.

\* \* \* \* \*